United States Patent
Rober et al.

(10) Patent No.: US 7,686,382 B2
(45) Date of Patent: Mar. 30, 2010

(54) REVERSIBLY DEPLOYABLE AIR DAM

(75) Inventors: Kevin B. Rober, Washington, MI (US); Alan L. Browne, Grosse Pointe, MI (US); Nancy L. Johnson, Northville, MI (US); Jan H. Aase, Oakland Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/533,878

(22) Filed: Sep. 21, 2006

(65) Prior Publication Data

US 2007/0216194 A1    Sep. 20, 2007

Related U.S. Application Data

(60) Provisional application No. 60/725,685, filed on Oct. 12, 2005.

(51) Int. Cl.
*B62D 35/00* (2006.01)
(52) U.S. Cl. .................................. 296/180.1
(58) Field of Classification Search .... 296/180.1–180.5
See application file for complete search history.

(56) References Cited

U.S. PATENT DOCUMENTS

| 4,489,806 | A | 12/1984 | Shimomura | 180/193 |
| 4,558,897 | A | 12/1985 | Okuyama et al. | 296/1 S |
| 4,770,457 | A | 9/1988 | Tomforde | 296/1 S |
| 4,810,022 | A | 3/1989 | Takagi et al. | 296/180.5 |
| 4,902,067 | A | 2/1990 | Sakai et al. | 296/180.1 |
| 6,209,947 | B1 * | 4/2001 | Rundels et al. | 296/180.1 |
| 6,626,486 | B2 * | 9/2003 | Lane | 296/217 |
| 2005/0194815 | A1 | 9/2005 | Mc Knight et al. | 296/180.5 |

FOREIGN PATENT DOCUMENTS

FR     2816905 A1 *    5/2002

OTHER PUBLICATIONS

International Search Report dated Apr. 26, 2007 for PCT /US06/37051 corresponding to this application.

\* cited by examiner

*Primary Examiner*—Glenn Dayoan
*Assistant Examiner*—Melissa A Black (57) ABSTRACT

Vehicle air dams that include an airflow control member and an active material based actuator for deploying the airflow control member so as to change airflow about the vehicle.

10 Claims, 6 Drawing Sheets

REVERSIBLY DEPLOYABLE AIR DAM

CROSS REFERENCE TO RELATED APPLICATIONS

This application relates to and claims the benefit of priority to U.S. Provisional Patent Application No. 60/725,685 filed on Oct. 12, 2005, incorporated herein by reference in its entirety.

BACKGROUND

The present disclosure relates to airflow control devices for vehicles, and more particularly, to reversibly deployable air dams for vehicles that use active materials to effect deployment and retraction.

Airflow over, under, around, and/or through a vehicle can affect many aspects of vehicle performance including vehicle drag, vehicle lift and down force, and cooling/heat exchange for a vehicle power train and air conditioning systems. Reductions in vehicle drag improve fuel economy. Vehicle lift and downforce can affect vehicle stability and handling. As used herein, the term "airflow" refers to the motion of air around and through parts of a vehicle relative to either the exterior surface of the vehicle or surfaces of elements of the vehicle along which exterior airflow can be directed such as surfaces in the engine compartment. The term "drag" refers to the resistance caused by friction in a direction opposite that of the motion of the center of gravity for a moving body in a fluid. The term "lift" as used herein refers to the component of the total force due to airflow relative to a vehicle, acting on the vehicle in a vertically upward direction. The term "downforce" used herein refers to the component of total force due to airflow relative to the vehicle acting on a vehicle in a vertically downward direction.

Devices known in the art of vehicle manufacture to control airflow relative to a vehicle are generally of a predetermined, non-adjustable geometry, location, orientation and stiffness. Such devices generally do not adapt as driving conditions change, thus the airflow relative to the vehicle cannot be adjusted to better suit the changing driving conditions. Additionally, current under-vehicle airflow control devices can reduce ground clearance. Vehicle designers are faced with the challenge of controlling the airflow while maintaining sufficient ground clearance to avoid contact with and damage by parking ramps, parking blocks, potholes, curbs and the like. Further, inclement weather, such as deep snow, slush or rainfall, can damage the device and/or impair vehicle handing.

Current stationary airflow control devices may be adjustable by mounting and/or connecting the devices to hydraulic, mechanical, electrical actuators and/or the like. For example, some vehicle airflow control devices may adjust location and/or orientation in response to an actuator signal. However, such actuators generally require additional components such as pistons, motors, solenoids and/or like mechanisms for activation, which increase the complexity of the device often resulting in increased failure modes, maintenance, and manufacturing costs. Therefore, there exists a need for an adjustable device for controlling vehicle airflow under varying driving conditions that enhances device simplicity while reducing device problems and the number of failure modes.

Figure 1:
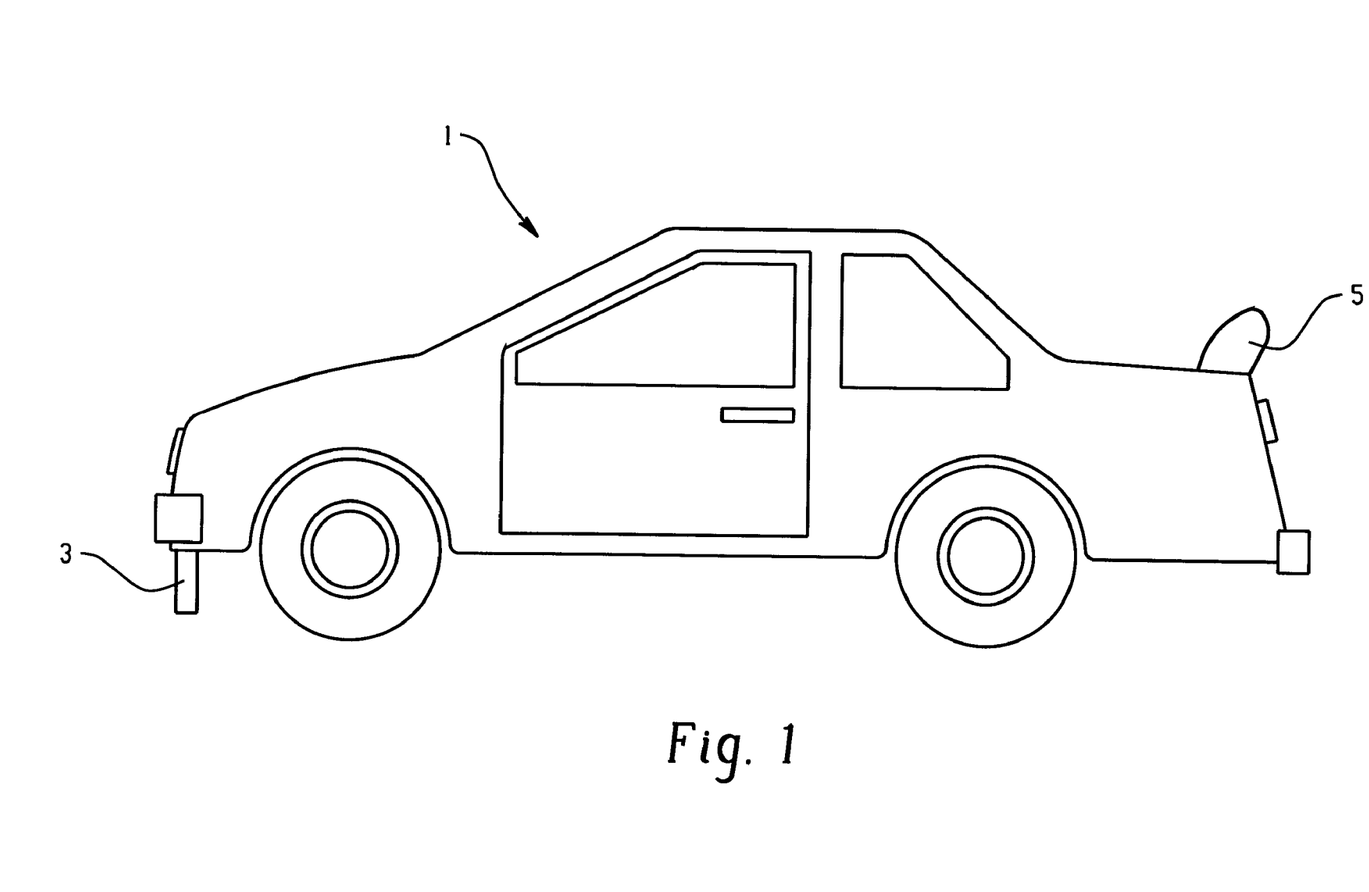
FIG. 1 illustrates a vehicle that includes an air dam and a spoiler in locations typically associated with their respective functions.

There are many general types of airflow control devices used for vehicles, two of these are air dams and spoilers. FIG. 1 illustrates a vehicle 1 that includes an air dam 3 and a spoiler 5 in locations typically associated with their functions as discussed below. Air dams differ from spoilers in terms of form, functionality, placement, and design. Air dams can generally be defined as frontal airflow restrictors designed to smooth the flow of air around (under) a vehicle, decreasing the coefficient of drag, improving fuel economy, handling, and maneuvering at high speeds. In contrast, a spoiler is designed to improve traction by increasing the downward force on the rear portion of a vehicle. The use of spoilers increases the cornering capability and improves stability at high speeds, but often at the expense of additional aerodynamic drag and weight.

Current air dams and spoilers are generally of a fixed geometry, location, orientation, and stiffness. Such devices can thus not be relocated, reoriented, reshaped, etc. as driving conditions change and thus airflow over/under/around the vehicle body can not be adjusted to better suit the changed driving condition. Also, current air dams reduce the vehicle's ground clearance, and thus presents a constant challenge to designers to provide the needed control of airflow while maintaining sufficient ground clearance to avoid contact with and being damaged by parking ramps, parking blocks, and encounters with potholes and curbs. Along these lines underbody airflow control devices, if they extend sufficiently close to the ground, can present a problem with regards to driving through deep standing water, slush, snow, and off-road unpaved surfaces.

Accordingly, it would be desirable to have a deployable air dam that can be selectively deployed and retracted according to the driving conditions.

BRIEF SUMMARY

Disclosed herein are air dams that define a surface of the vehicle that can, through its alterable ground clearance, modify the airflow under the vehicle during movement of the vehicle. In one embodiment, a vehicle air dam system comprises a housing having a opening; an airflow control member translatably disposed within the housing and slidably engaged with the opening; and an active material actuator comprising an active material in operative communication with the airflow control member to effect deployment and retraction of the airflow control member from and into the housing.

In another embodiment, the air dam comprises a housing comprising an airflow control member rotatably disposed within the housing, wherein rotation of the airflow control member increases or decreases airflow under the vehicle during movement of the vehicle; and an active material actuator comprising an active material in operative communication with the airflow control member to effect rotation of the airflow control member.

In yet another embodiment, the air dam comprises a flexible surface positioned on the vehicle so as to affect airflow under the vehicle upon flexure thereof; a rotatable cam in contact with the flexible surface; and an active material actuator comprising an active material in operative communication with the airflow control member to effect rotation of the cam and cause flexure to the flexible surface The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Active material actuated reversibly deployable air dams are disclosed herein. The air dams are suitable for use on a vehicle on which it might be desirable to have tunable frontal airflow restrictors that are designed to smooth the flow of air around and under a vehicle as may be desired by the driving conditions, selectively decrease the coefficient of drag, as well as improve fuel economy, handling, and maneuvering at high speeds such as vehicles that can be utilized on occasion in competitive driving. Even more specifically, either deployment or stowing of the air dams in these embodiments is preferably in each case based on either a rigid body translation or rotation effected through just a single activation cycle (or at most a very small number of activation cycles) of an active material. Obviously, as described above, there is benefit associated with being able to deploy/stow the air dam to match the needs of different driving conditions. Beyond this, however, there are significant advantages that accrue to basing the functionality of these devices on active materials. Specific advantages associated with utilizing active materials to effect these changes include increased device simplicity, a reduced number of failure modes and thus increased device robustness, and reduced device volumes, masses, and energy requirements for activation because of their higher energy densities.

The classes of active materials included are those that exhibit a change in stiffness and/or dimensions in response to an actuation signal which can take various forms depending on the particular active material. Suitable active materials include, but are not limited to, shape memory alloys (SMA), shape memory polymers (SMP), electroactive polymers (EAP), ferromagnetic SMAs, electrorheological fluids (ER), magnetorheological fluids (MR), dielectric elastomers, ionic polymer metal composites (IPMC), piezoelectric polymers, piezoelectric ceramics, various combinations of the foregoing materials, and the like such as is disclosed in pending U.S. patent application Ser. Nos. 10/983,330, 10/893,119, 10/872,327, and 10/983,329, all of which are incorporated by reference in their entireties.

Figure 2:
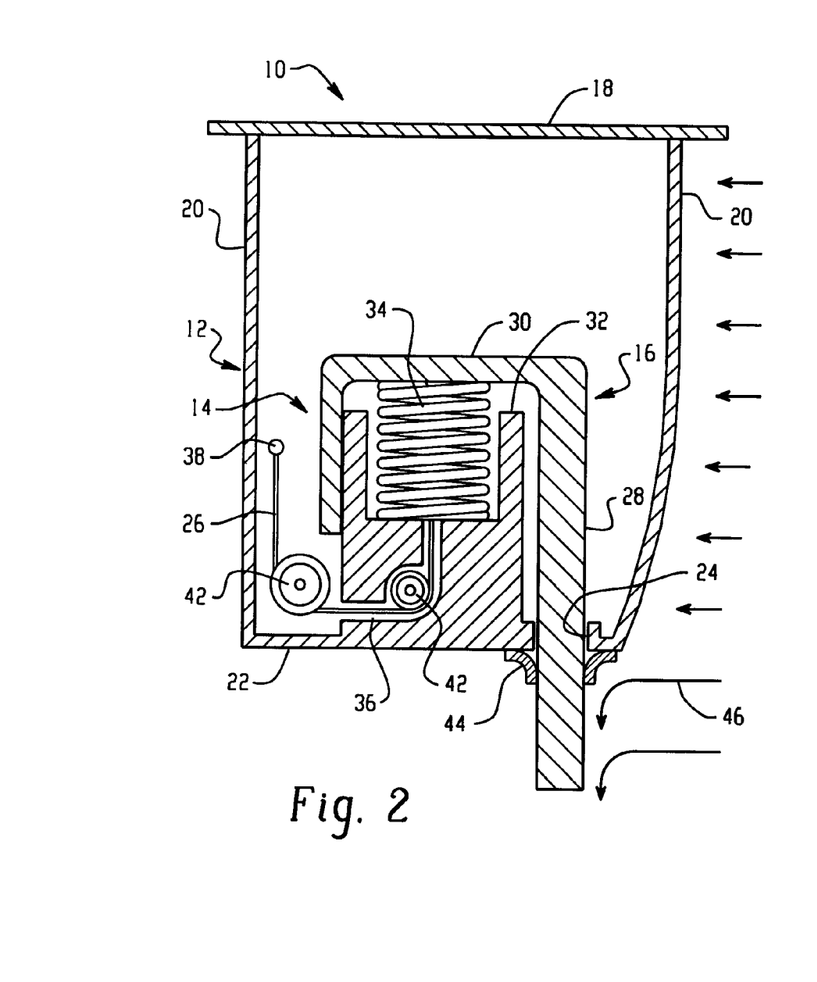
FIG. 2 illustrates a sectional view of a reversibly deployable air dam for a vehicle in a deployed position in accordance with one embodiment of the present disclosure.
Figure 3:
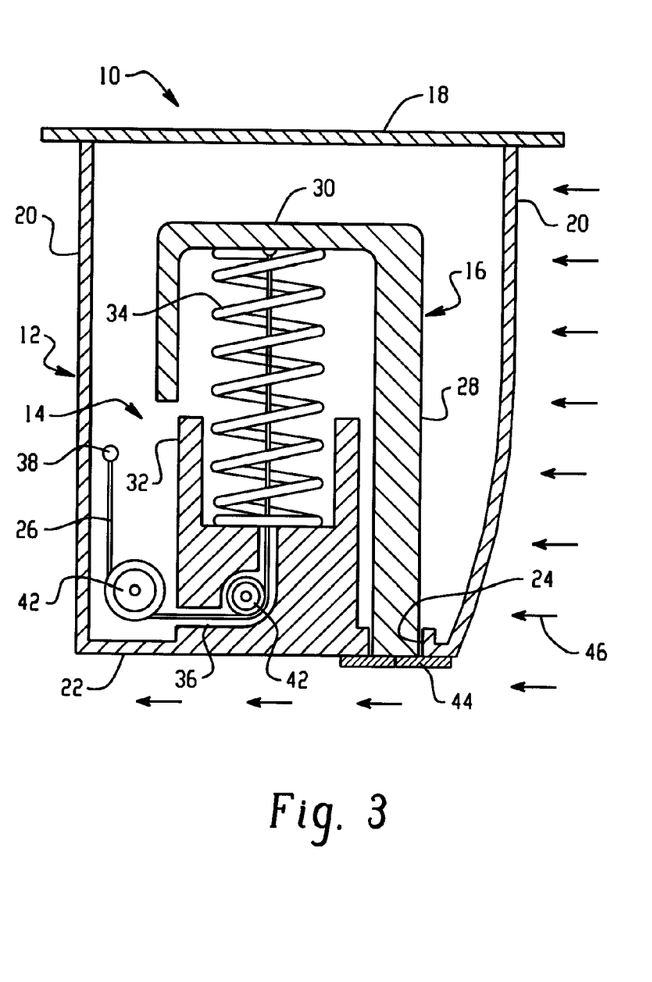
FIG. 3 illustrates a sectional view of the reversibly deployable air dam of FIG. 2 in a retracted position.

In an embodiment shown in FIGS. 2 and 3, there is shown an air dam generally designated by reference numeral 10 in the deployed and retracted positions, respectively. The air dam 10 includes a housing 12 that contains an active material based actuator 14 and a deployable airflow member 16. The housing 12 has a top wall 18, sidewalls 20 extending from the top wall and a bottom wall 22. The housing 12 includes a slot opening 24 in the bottom wall 22 and is configured to permit retraction and deployment of the airflow control member 16 into and out of the housing 12. The active material 26 is in operative communication with the deployable airflow member to provide the retraction and deployment.

Using shape memory alloys as an exemplary active material, a shape memory alloy wire 26 is tethered at one end to a selected one of the walls or stationary anchor structure 38 within the housing 12 and at the other end is tethered to the second portion 30 of the airflow control member 16. As shown, the deployable airflow member 16 is generally "L" shaped having a first portion 28 slidably engaged with the slot opening 24 and a second portion 30 substantially perpendicular to the first portion. The housing 12 further includes a bias spring retaining structure 32 that is attached or integral to the bottom wall 22 to which the airflow control member 16 is slidably mounted. A bias spring 34 is disposed intermediate and in a biased relationship with the second portion of the airflow control member 16 and the bias spring retaining structure 32. The bias spring retaining structure 32 further includes a channel 36 for receiving the shape memory alloy wire 26, which has one end fixedly attached to an anchor structure 38 within the housing and the other end and fixedly attached to the second portion 30. The shape memory alloy wire 26 is disposed about one or more pulleys 42 (two of which are shown) and threaded through the channel 36 to provide vertical movement of the airflow control member 16. Activation of the shape memory alloy wire 26 causes a phase transformation, which results in contraction of the wire with a force sufficient to overcome those forces associated with the bias spring 34. The result is that the airflow control member 16 is slidably deployed from the slot opening 24. Deactivation causes the bias spring to psuedoplastically deform the shape memory alloy back to about its original position and length, which also results in retracting the airflow control member 16. In this manner, airflow as indicated by arrows 46 can be altered, which can be used to affect the vehicle drag caused by the airflow on the vehicle. An optional seal 44 flap or otherwise, is disposed about the slot opening 24 to prevent particulate matter from entering the housing.

For this and other embodiments disclosed herein, the bias spring is generally chosen so that its axial stiffness (i.e., spring constant) is greater than that of the active material when the active material is not activated. For example, in the case of the shape memory alloy wire, the axial stiffness of the bias spring is chosen to be greater than that of the shape memory alloy wire when it is in its lower temperature martensite stiffness and is less than that of the wire when it is in its higher temperature austenite phase.

Figure 4:
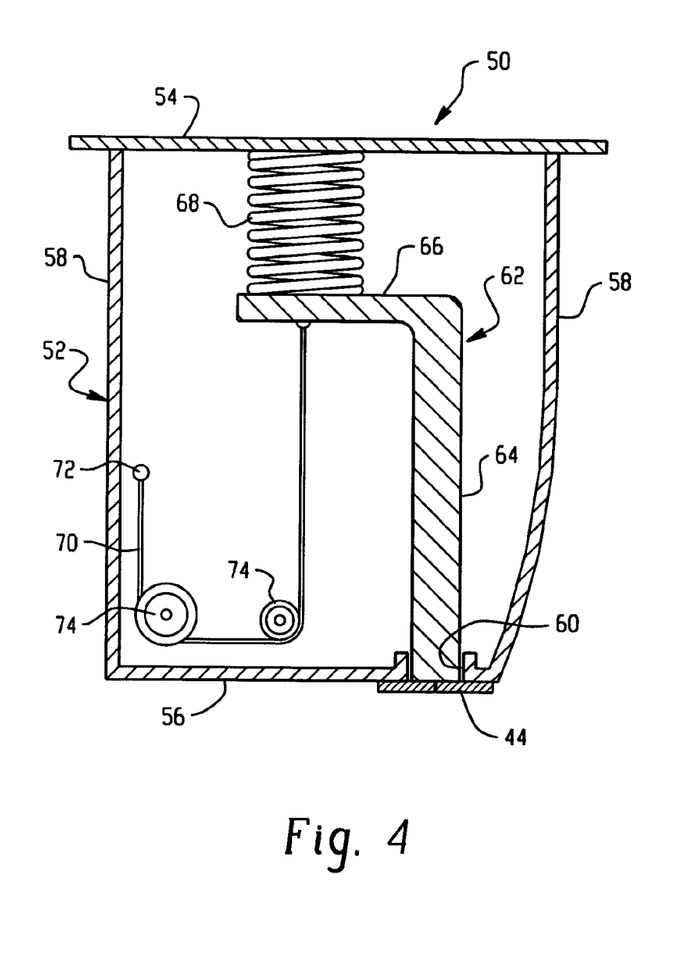
FIG. 4 illustrates a sectional view of a reversibly deployable air dam for a vehicle in a retracted position in accordance with another embodiment of the present disclosure.
Figure 5:
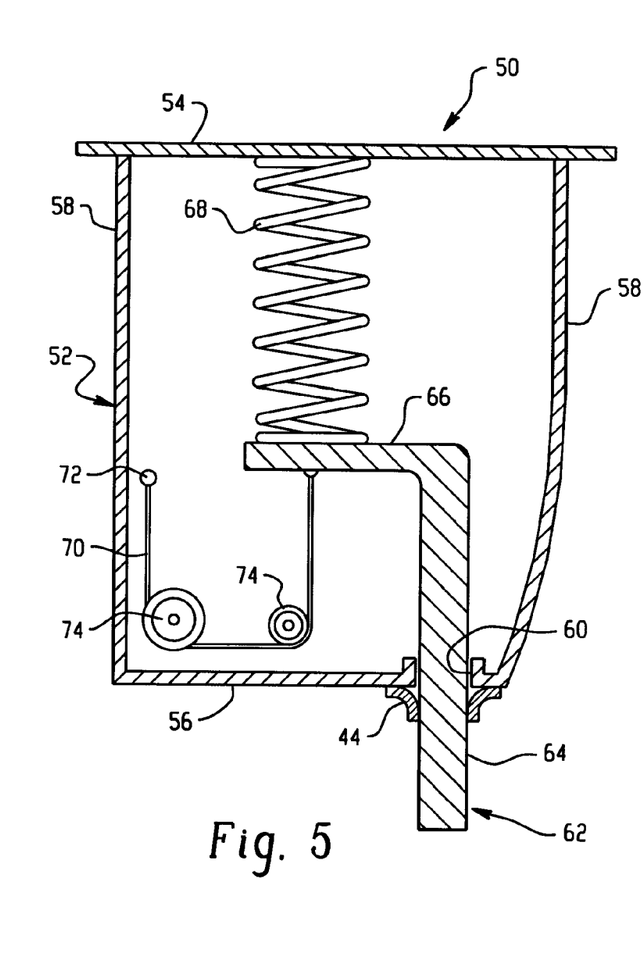
FIG. 5 illustrates a sectional view of the reversibly deployable air dam of FIG. 4 in a deployed position.

In FIGS. 4 and 5, an air dam 50 is shown in the retracted and deployed positions, respectively. The air dam 50 includes a housing 52 having a top wall 54, a bottom wall 56, and sidewalls 58. The housing 52 further includes a slot opening 60 in which an airflow control member 62 is slidably engaged therewith. The airflow control member 62 is generally "L" shaped having a first portion 64 and a second portion 66 substantially perpendicular to the first portion. A bias spring 68 has one end fixed attached to the second portion 66 and the other end fixedly attached to the top wall 54. An active material 70, e.g., is tethered at one end to a selected one of the walls or stationary anchor structure 72 within the housing 62 and at the other end is tethered to the second portion 66 of the airflow control member 62. The shape memory alloy wire 70 is disposed about one or more pulleys 74 and configured to provide vertical movement of the airflow control member 62. Activation of the shape memory alloy wire 70 causes a phase transformation, which results in contraction of the wire with a force sufficient to overcome those forces associated with the bias spring 68.

In this embodiment, activation of the shape memory alloy wire 70 would cause simultaneous contraction of the shape memory alloy wire and expansion of the bias spring to deploy the airflow control member 62 as opposed to compressive process shown in previous embodiment discussed immediately above. Deactivation of the shape memory alloy wire would result in the bias spring pseudoplastically deforming the shape memory alloy wire to retract the airflow control member within the housing 62. A seal can be disposed about the slot opening.

Figure 6:
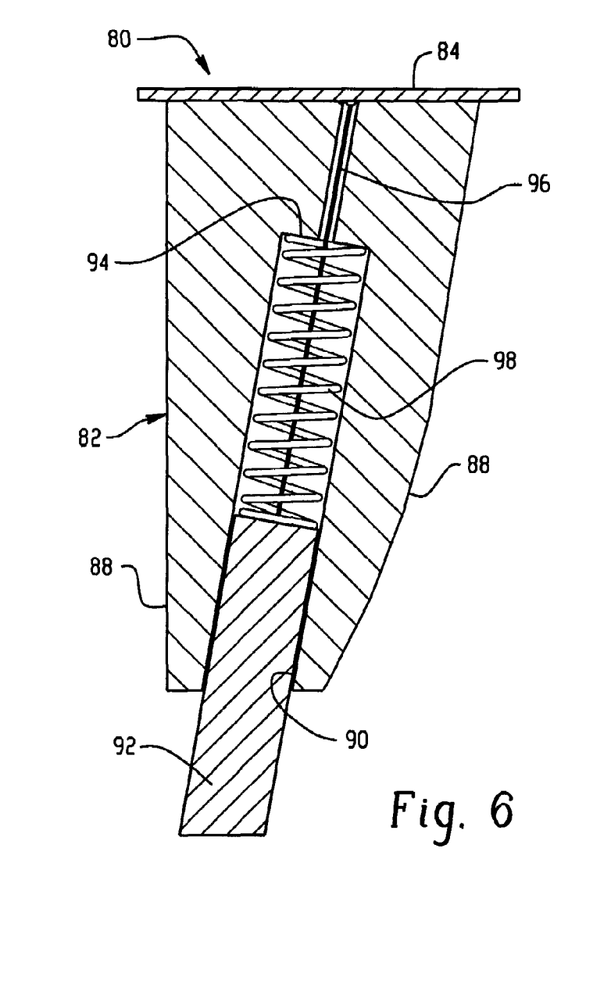
FIG. 6 illustrates a sectional view of a reversibly deployable air dam for a vehicle in a retracted position in accordance with yet another embodiment of the present disclosure.
Figure 7:
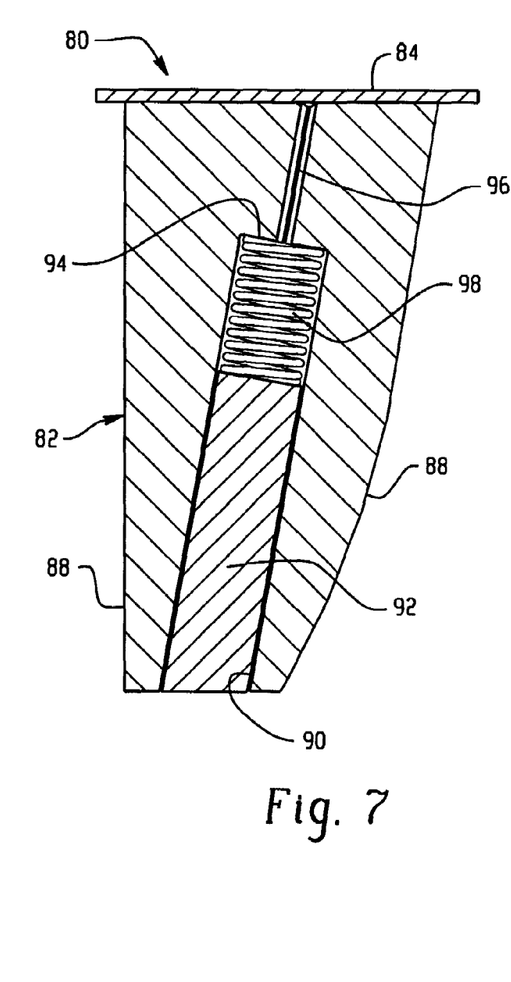
FIG. 7 illustrates a sectional view of the reversibly deployable air dam of FIG. 6 in a retracted position.

In FIGS. 6 and 7, an air dam 80 is shown in the deployed and retracted positions, respectively. The air dam 80 includes a housing 82 having a top wall 84, and sidewalls 88. The housing 52 further includes a slot opening 90 in which an airflow control member 92 is slidably engaged therewith. The slot opening 90 extends to the top wall and includes a shoulder 94 distally located from the initial opening 90. The airflow control member 92 has a generally planar shape and is slidably engaged with the slot opening.

An active material 96, e.g., shape memory alloy wire, is tethered at one end to the airflow control member 92 and at the other end to the top wall 84 within the housing 82. The shape memory alloy wire 96 is configured to provide vertical movement of the airflow control member 82. A bias spring 98 is seated onto the shoulder 94 and is in contact with the airflow control member 92. The bias spring 98 is dimensioned such that in the absence of an activation signal to the shape memory alloy wire, the bias spring positions the airflow control member 82 into the airflow path, i.e., causes deployment of the airflow control member from the housing. Upon activation of the shape memory alloy wire, the wire contracts causing the bias spring to compress, thereby retracting the airflow control member 82. As such, the length of the slot opening to the shoulder of the recess is about equal or less than the length of the airflow deployable member 92 and the length of the bias spring upon compression by the shape memory alloy wire.

Figure 8:
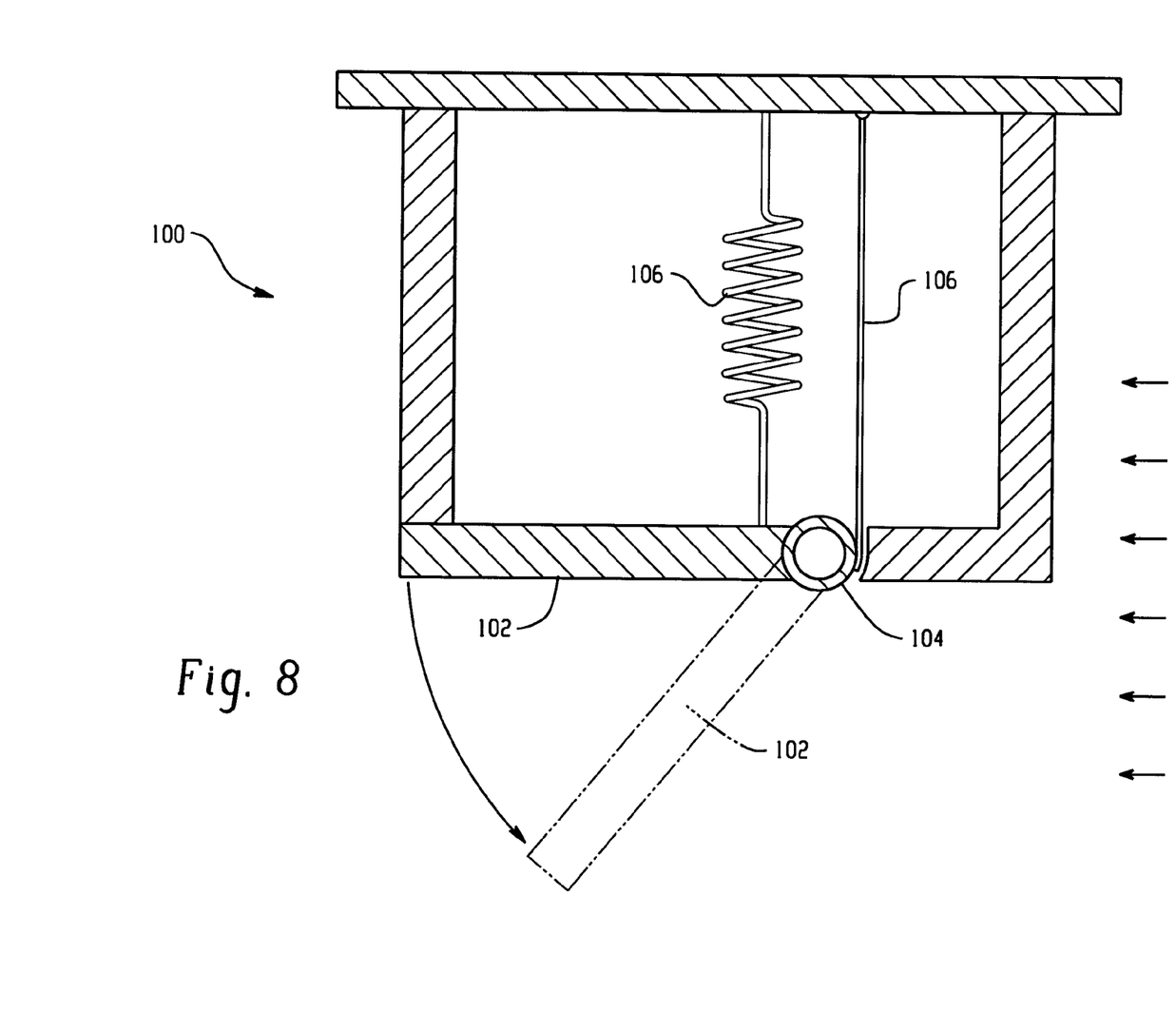
FIG. 8 illustrates a sectional view of a reversibly deployable air dam that employs a rotary mechanism in accordance with another embodiment.

In another embodiment shown in FIG. 8, an air dam 100 is depicted in which the active material (one or more) is connected externally either directly or remotely to the airflow control surface 102. In this example, the airflow control surface 102 is attached to an axle 104, which is free to rotate about its axis. A spring 106 and an SMA wire 108 are attached to the axle 104 in an opposing fashion such that their tensions balance each other and rotation of the tube through external means will increase the tension in one while reducing tension in the other. At low vehicle speeds, tension in the spring 106 combined with reduced stiffness and greater length in the SMA wire 108 keeps the air dam rotated flush to the vehicle surface and out of the way. At high vehicle speeds, the temperature of the SMA wire is raised, e.g., through resistance heating, to produce a phase change from martensite to austenite in the SMA wire. This results in typically a four percent reduction in its length and a significant increase in its stiffness. This combined change in length and stiffness results in a rotation—deployment—of the airflow control device and a stretching of the counterbalancing spring 106. Upon shutting off the current that is causing resistance heating of the SMA wire, the wire cools to its martensite phase and the stretched spring returns the airflow control device to its stowed position.

Although reference has been made specifically to the use of shape memory alloys, it is to be noted that an EAP could also be used in place of SMA as the actuator in these embodiments in order to achieve the desired linear or rotary deployment. Especially in the case of deployment by translation, packaging becomes much less an issue with EAP, as variously in tendon, sheet, or slab form, EAP can be made to experience 100% strain when subjected to an applied voltage.

Figure 9:
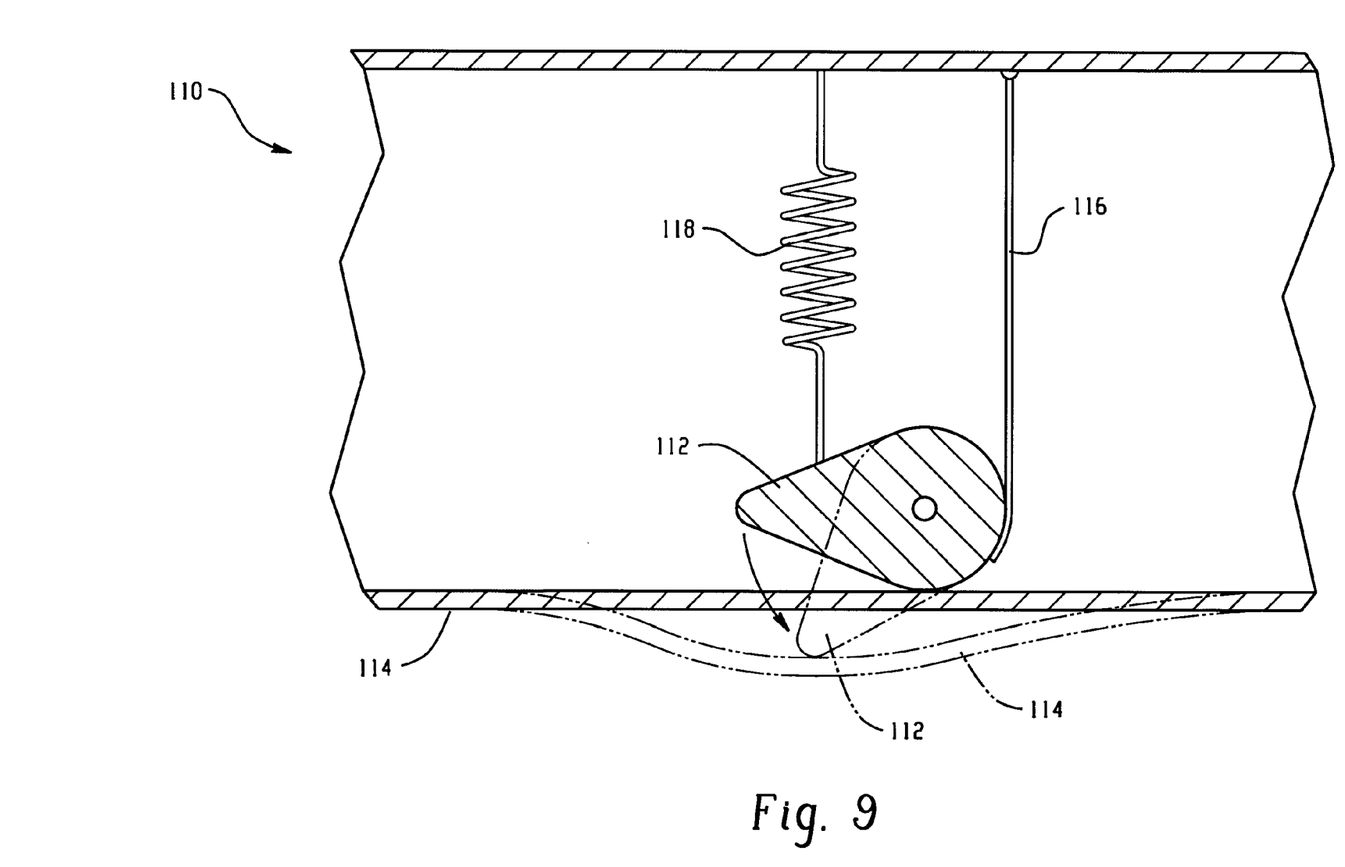
FIG. 9 illustrates a sectional view of a reversibly deployable air dam that employs a rotary mechanism in accordance with yet another embodiment.

Embodiments are also envisioned, as indicated, in which the externally attached active material is used to morph the airflow control surface(s) of the air dam. As shown in FIG. 9, the air dam 110 includes a cam-like device that is located adjacent to a flexible surface of an airflow control member 114. Activation of an active material 116 physically linked to the cam 112, such as an SMA wire or spring or an EAP sheet or tendon will cause rotation of the cam, which rotation elastically deforms the flexible airflow control surface of the airflow control device. A bias spring 118 that could take various forms, or the energy stored elastically in the deformed surface could be used to return the surface of the airflow control device to its original configuration once the activation signal is removed.

In an alternative embodiment, the air dam devices can be configured with latching mechanisms, either active material actuated or otherwise, that hold the deployable airflow control device in either the deployed or stowed positions thus allowing power off position/shape hold, i.e., power for actuation is then only needed in these embodiments during deploying or stowing of the active airflow control device.

As used herein, the term "shape memory polymer" generally refers to a polymeric material, which exhibits a change in a property, such as an elastic modulus, a shape, a dimension, a shape orientation, or a combination comprising at least one of the foregoing properties upon application of an activation signal. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing. Shape memory polymers as a general class of materials do not exhibit large return forces when activated making them in general not that well suited as actuators. However, material formulations are emerging in which the return forces are significantly greater, and in anticipation of this they are included in this invention in terms of their potential suitability for effecting the reversible deployment of the air dam as described herein. An additional advantage of their use is that when deactivated, the modulus increase is sufficient for them to serve the additional function of a zero power hold position latching/locking mechanism.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges disclosed herein are inclusive of the endpoints and independently combinable.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be shaped. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent from the temperature in the temperature interval of interest.

The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 20° C. Another temperature for shape recovery may be greater than or equal to about 70° C. Another temperature for shape recovery may be less than or equal to about 250° C. Yet another temperature for shape recovery may be less than or equal to about 200° C. Finally, another temperature for shape recovery may be less than or equal to about 180° C.

Suitable polymers for use in the SMPs include thermoplastics, thermosets, interpenetrating networks, semi-interpenetrating networks, or mixed networks of polymers. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsesquioxane), polyvinyl chloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). The polymer(s) used to form the various segments in the SMPs described above are either commercially available or can be synthesized using routine chemistry. Those of skill in the art can readily prepare the polymers using known chemistry and processing techniques without undue experimentation.

Shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory alloy to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Active materials also include, but are not limited to, shape memory material such as magnetic materials and magnetorheological elastomers. Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper. Suitable MR elastomer materials have previously been described.

The air dams and methods of the present disclosure are able to adjust features such as shape, dimension, stiffness, location, combinations thereof, and the like by changing the at least one attribute of active material to match the needs of different driving conditions. Changes in at least one attribute of active material include shape, dimension, stiffness, combinations thereof and the like. Utilizing active materials to affect these changes provide devices of increased simplicity and robustness, while reducing the number of failure modes, device volume and energy requirements for activation due to higher energy densities.

The active material may also comprise an electroactive polymer such as ionic polymer metal composites, conductive polymers, piezoelectric material and the like. As used herein, the term "piezoelectric" is used to describe a material that mechanically deforms when a voltage potential is applied, or conversely, generates an electrical charge when mechanically deformed.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity (for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The active material may also comprise a piezoelectric material. Also, in certain embodiments, the piezoelectric material may be configured as an actuator for providing rapid deployment. As used herein, the term "piezoelectric" is used to describe a material that mechanically deforms (changes shape) when a voltage potential is applied, or conversely, generates an electrical charge when mechanically deformed. Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVC2"), and their derivatives; polyacrylonitriles ("PAN"), and their derivatives; polycarboxylic acids, including poly(methacrylic acid ("PMA"), and their derivatives; polyureas, and their derivatives; polyurethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof; and Group VIA and IIB compounds, such as CdSe, CdS, GaAs, $AgCaSe_2$, ZnSe, GaP, InP, ZnS, and mixtures thereof.

Suitable active materials also comprise magnetorheological (MR) compositions, such as MR elastomers, which are known as "smart" materials whose rheological properties can rapidly change upon application of a magnetic field. MR elastomers are suspensions of micrometer-sized, magnetically polarizable particles in a thermoset elastic polymer or rubber. The stiffness of the elastomer structure is accomplished by changing the shear and compression/tension moduli by varying the strength of the applied magnetic field. The MR elastomers typically develop structure when exposed to a magnetic field in as little as a few milliseconds. Discontinuing the exposure of the MR elastomers to the magnetic field reverses the process and the elastomer returns to its lower modulus state.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. An air dam assembly adapted for use with a vehicle, the assembly defining a surface of the vehicle that can increase or decrease airflow within a space under the vehicle during movement of the vehicle, the assembly comprising:
   a housing attachable to the vehicle, and defining an opening exposable to the space under the vehicle;
   an air dam translatably disposed within the housing and slidably engaged with the opening; and
   an active material actuator comprising an active material in operative communication with the air dam and configured to selectively effect deployment of the air dam from the housing and into the space, so as to decrease airflow therein,
   wherein the active material actuator comprises a shape memory alloy wire having one end linked to the air dam and a bias spring attached to the air dam configured to provide a counter force to that provided by the shape memory alloy wire,
   wherein the bias spring has a spring constant greater than a spring constant of the shape memory alloy wire when the shape memory alloy wire is in a martensite phase and is less than the spring constant of the shape memory alloy wire when the shape memory alloy wire is in a austenite phase.

2. The assembly of claim 1, wherein the active material is selected from a group consisting of shape memory alloys, shape memory polymers, electroactive polymers, ferromagnetic shape memory alloys, electrorheological fluids, magnetorheological fluids, dielectric elastomers, ionic polymer metal composites, piezoelectric polymers, and piezoelectric ceramics.

3. The assembly of claim 1, further comprising a seal disposed about the opening, the seal configured to prevent particulate matter from entering the housing.

4. The assembly of claim 1, further comprising at least one pulley in operative communication with the shape memory alloy wire.

5. The assembly of claim 1, wherein the housing comprises a top wall, a bottom wall and sidewalls extending therebetween, wherein the bottom wall comprises a bias spring retaining structure within the housing, wherein the air dam comprises a first portion in sliding engagement with the opening and a second portion with the bias spring intermediate the bias spring retaining structure and the second portion, and wherein the shape memory alloy wire is configured to contract and compress the bias spring upon activation and extend the first portion from the housing.

6. The assembly of claim 5, wherein the bias spring is configured to expand and retract the first portion into the housing when the shape memory alloy wire is not activated.

7. The assembly of claim 1, wherein the housing comprises a top wall, a bottom wall and sidewalls extending therebetween, wherein the air dam comprises a first portion in sliding engagement with the opening and a second portion with the bias spring intermediate the top wall and the second portion, and wherein the shape memory alloy wire is configured to contract and expand the bias spring upon activation and extend the first portion from the housing.

8. The assembly of claim 7, wherein the bias spring is configured to compress and retract the first portion into the housing when the shape memory alloy wire is not activated.

9. The assembly of claim 1, wherein the air dam has a substantially linear shape orientation that is in sliding engagement with the opening, wherein the bias spring is seated on a shoulder of the opening and is intermediate the air dam and the shoulder, and wherein the shape memory alloy wire is configured to contract and compress the bias spring upon activation and retract the air dam into the housing.

10. The assembly of claim 9, wherein the bias spring is configured to expand and deploy the air dam from the housing when the shape memory alloy wire is not activated.

* * * * *